United States Patent
Nagai

(10) Patent No.: US 12,484,562 B2
(45) Date of Patent: Dec. 2, 2025

(54) FISHING SPINNING REEL

(71) Applicant: GLOBERIDE, Inc., Tokyo (JP)

(72) Inventor: Ryou Nagai, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 341 days.

(21) Appl. No.: 18/111,751

(22) Filed: Feb. 20, 2023

(65) Prior Publication Data

US 2023/0301286 A1  Sep. 28, 2023

(30) Foreign Application Priority Data

Mar. 22, 2022 (JP) .................. 2022-045008

(51) Int. Cl.
*A01K 89/00* (2006.01)
*A01K 89/01* (2006.01)

(52) U.S. Cl.
CPC .... *A01K 89/006* (2013.01); *A01K 89/011223* (2015.05)

(58) Field of Classification Search
CPC ................ A01K 89/01; A01K 89/006; A01K 89/01121; A01K 89/011223; A01K 89/01123; A01K 89/01126; A01K 89/01906; A01K 89/01907
See application file for complete search history.

(56) References Cited

U.S. PATENT DOCUMENTS

| | | | |
|---|---|---|---|
| 8,011,610 B2 * | 9/2011 | Law | A01K 89/006 242/283 |
| 10,045,518 B2 * | 8/2018 | Shen | A01K 89/006 |
| 10,433,531 B2 * | 10/2019 | Kawamata | A01K 89/006 |
| 2016/0270381 A1 | 9/2016 | Saito | |
| 2018/0368377 A1 | 12/2018 | Shimizu et al. | |
| 2019/0116771 A1 | 4/2019 | Kawamata | |

FOREIGN PATENT DOCUMENTS

| | | | |
|---|---|---|---|
| JP | 2003284458 A | | 10/2003 |
| JP | 2010158184 A | * | 7/2010 |
| JP | 2014198021 A | | 10/2014 |
| JP | 2017108717 A | | 6/2017 |
| JP | 2020162470 A | * | 10/2020 |

OTHER PUBLICATIONS

Extended European Search Report for related European Application No. 23155193.8; action dated Aug. 3, 2023; (7 pages).
Apr. 9, 2024 Office Action issued in Australian Patent Application No. 2023200622.
Jan. 28, 2025 Office Action issued in Japanese Patent Application No. 2022-045008.
Jul. 29, 2025 Office Action issued in Chinese Patent Application No. 202310200638.9.

* cited by examiner

*Primary Examiner* — Anna M Momper
(74) *Attorney, Agent, or Firm* — Oliff PLC

(57) ABSTRACT

A fishing spinning reel is configured such that a handle is attachable to and detachable from a reel body. The fishing spinning reel comprises a drive gear shaft that is provided in the reel body, ball bearings that are externally fitted into the drive gear shaft and rotatably support the drive gear shaft, and a handle shaft that is provided in the handle and is screwed into the drive gear shaft. The handle shaft is integrally provided with an abutting portion that abuts on inner rings of the ball bearings by the screwing into the drive gear shaft.

6 Claims, 6 Drawing Sheets

FISHING SPINNING REEL

CROSS-REFERENCE TO RELATED APPLICATION

This application claims priority under 35 U.S.C. § 119 to Japanese Patent Application No. 2022-045008 filed on Mar. 22, 2022 in the Japanese Patent Office, the entire contents of which is hereby incorporated by reference.

FIELD

The present disclosure relates to a fishing spinning reel.

BACKGROUND

Conventionally, a fishing spinning reel in which a handle is attachable to and detachable from a reel body is known (see, for example, JP 2017-108717 A). In the fishing spinning reel disclosed in JP 2017-108717 A, the handle is attached by screwing a handle shaft into a drive gear shaft of the reel body. The fishing spinning reel includes a cylindrical member provided between the drive gear shaft and the handle shaft, and a ball bearing rotatably supporting the drive gear shaft. The drive gear shaft includes a drive gear and is rotatably supported via the ball bearing.

In the cylindrical member disclosed in JP 2017-108717 A, a portion facing an end of the drive gear shaft faces the end with a gap therebetween. On the other hand, the cylindrical member is configured to be buckled by abutting on the ball bearing supporting the drive gear shaft. As a result, JP 2017-108717 A prevents excessive application of the thrust of the handle shaft to the drive gear shaft due to screwing when the handle shaft is screwed into the drive gear shaft.

SUMMARY

In a structure disclosed in JP 2017-108717 A, a load acting on the drive gear shaft is prevented by the cylindrical member provided between the drive gear shaft and the handle shaft. For this reason, a connection structure of the drive gear shaft and the handle shaft becomes complicated, and it is necessary to manufacture each component with high dimensional accuracy, which leads to an increase in cost.

The present disclosure has been made to solve the above problems, and provides a fishing spinning reel that can simplify a connection structure of a drive gear shaft and a handle shaft and reduce cost.

In order to solve the above problems, the present disclosure provides a fishing spinning reel in which a handle is attachable to and detachable from a reel body. The fishing spinning reel comprises: a drive gear shaft that is provided in the reel body; a ball bearing that is externally fitted into the drive gear shaft and rotatably supports the drive gear shaft; and a handle shaft that is provided in the handle and is screwed into the drive gear shaft. The handle shaft is integrally provided with an abutting portion that abuts on an inner ring of the ball bearing by the screwing into the drive gear shaft.

In this fishing spinning reel, when the handle shaft is screwed into the drive gear shaft, the abutting portion of the handle shaft approaches and abuts on the inner ring of the ball bearing, and the handle shaft is fixed to the drive gear shaft. That is, the handle shaft can be fixed to the drive gear shaft in a state in which the crimping force due to the screwing of the handle shaft is suppressed by the stopper of the abutting portion on the inner ring of the ball bearing. As a result, it is possible to prevent an end of the drive gear shaft from being buckled due to the screwing of the handle shaft.

Since the abutting portion is provided integrally with the handle shaft, it is not necessary to interpose a conventional cylindrical member between the drive gear shaft and the handle shaft. Therefore, a connection structure of the drive gear shaft and the handle shaft can be simplified, and cost can be reduced.

In addition, since the abutting portion is provided integrally with the handle shaft, the handle shaft can be manufactured with high dimensional accuracy, and the strength is increased as compared with a case of using a conventional cylindrical member.

In addition, even if the ball bearing is deformed due to excessive tightening of the handle shaft, it is sufficient to replace the ball bearing which is cheaper than the drive gear shaft, so that maintenance is easy and repair cost can be reduced.

Preferably, the handle shaft comprises a base portion that has a large diameter and an insertion portion that is formed to have a smaller diameter than the base portion and is inserted into the drive gear shaft. In this case, the abutting portion is preferably provided at a boundary portion between the base portion and the insertion portion.

In this configuration, the abutting portion can be easily formed using a stepped portion between the large-diameter base portion and the small-diameter insertion portion, and the connection structure of the drive gear shaft and the handle shaft can be simplified.

Preferably, the handle shaft comprises a high-strength material having higher strength than the ball bearing.

In this configuration, when the handle shaft is excessively tightened, the ball bearing cheaper than the drive gear shaft can be deformed. Therefore, the maintenance is easy and the repair cost can be reduced.

Preferably, an outer diameter of the end of the drive gear shaft is smaller than an inner diameter of the ball bearing.

In this configuration, it is possible to form a space for releasing the buckled and deformed portion between the end of the drive gear shaft and the inner ring of the ball bearing. As a result, even if buckling occurs at the end of the drive gear shaft due to the excessive tightening of the handle shaft, an influence thereof can be resolved in the space for buckling deformation. Therefore, the maintenance such as the ball bearing replacement can be easily performed.

Preferably, the abutting portion comprises a portion facing the ball bearing and a portion facing the end of the drive gear shaft, and forms a flat surface over both the portions.

In this configuration, since workability of the handle shaft is improved, the cost can be reduced.

Preferably, the abutting portion simultaneously abuts on the inner ring of the ball bearing and an end face of the drive gear shaft when the handle shaft is screwed into the drive gear shaft, or abuts on the inner ring of the ball bearing after abutting on the end of the drive gear shaft when the handle shaft is screwed into the drive gear shaft.

In the configuration in which the abutting portion simultaneously abuts on the inner ring of the ball bearing and the end of the drive gear shaft, the handle shaft can be fixed to the drive gear shaft in a state in which the crimping force due to the screwing of the handle shaft is suppressed by the stopper of the abutting portion on the inner ring of the ball bearing and the end of the drive gear shaft. That is, it is possible to increase a portion (area) that supports the axial force due to the screwing of the handle shaft and to improve the strength.

In addition, in the configuration in which the abutting portion abuts on the inner ring of the ball bearing after the abutting portion abuts on the end of the drive gear shaft, the abutting portion abuts on the inner ring of the ball bearing after buckling the end of the drive gear shaft by the abutting of the abutting portion. Therefore, even in this case, since the portion that supports the axial force due to the screwing of the handle shaft can be finally increased, the strength can be improved.

According to the present disclosure, it is possible to obtain a fishing spinning reel in which a connection structure of a drive gear shaft and a handle shaft can be simplified and cost can be reduced.

DETAILED DESCRIPTION

A fishing spinning reel 100 according to each embodiment will be described with reference to the drawings. In the following description, terms "front and rear" and "up and down" are based on directions illustrated in FIG. 1, and terms "left and right" are based on directions illustrated in FIG. 2.

First Embodiment

First, a basic structure of the fishing spinning reel 100 will be described.

Figure 1:
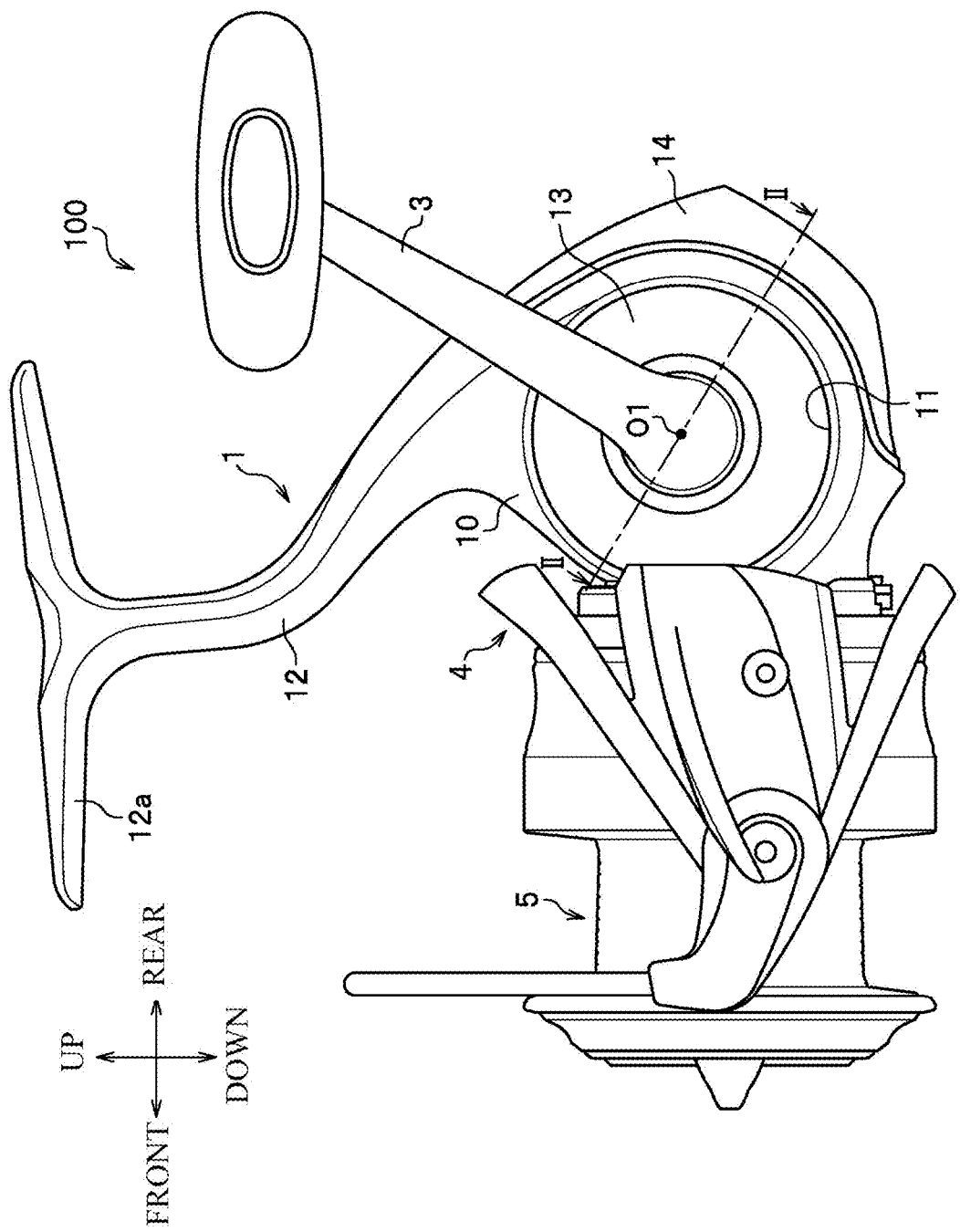
FIG. 1 is a side view illustrating an overall configuration of a fishing spinning reel according to a first embodiment of the present disclosure.

As illustrated in FIG. 1, the fishing spinning reel 100 comprises a reel body 1 to which a handle 3 is attached, a rotor 4 that is provided on the front side of the reel body 1 and rotates by a winding operation of the handle 3, and a spool 5 that is provided on the front side of the rotor 4 and reciprocates in a front-rear direction by the winding operation of the handle 3.

The reel body 1 comprises a body 10 that is provided with a side opening 11 opened toward the left side, a leg portion 12 that has a rod attachment portion 12a extending upward from an upper portion of the body 10 and mounted on a fishing rod at a distal end, a lid member 13 that closes the side opening 11, and a protective cover 14 that is attached to a rear portion of the body 10.

A drive shaft cylinder (not illustrated in the drawings) and a spool shaft 8 (partially illustrated in FIG. 2) are assembled to the reel body 1 so as to protrude forward from a front portion of the body 10. The rotor 4 is attached to a front end of the drive shaft cylinder. The spool 5 is attached to a front end of the spool shaft 8.

Figure 2:
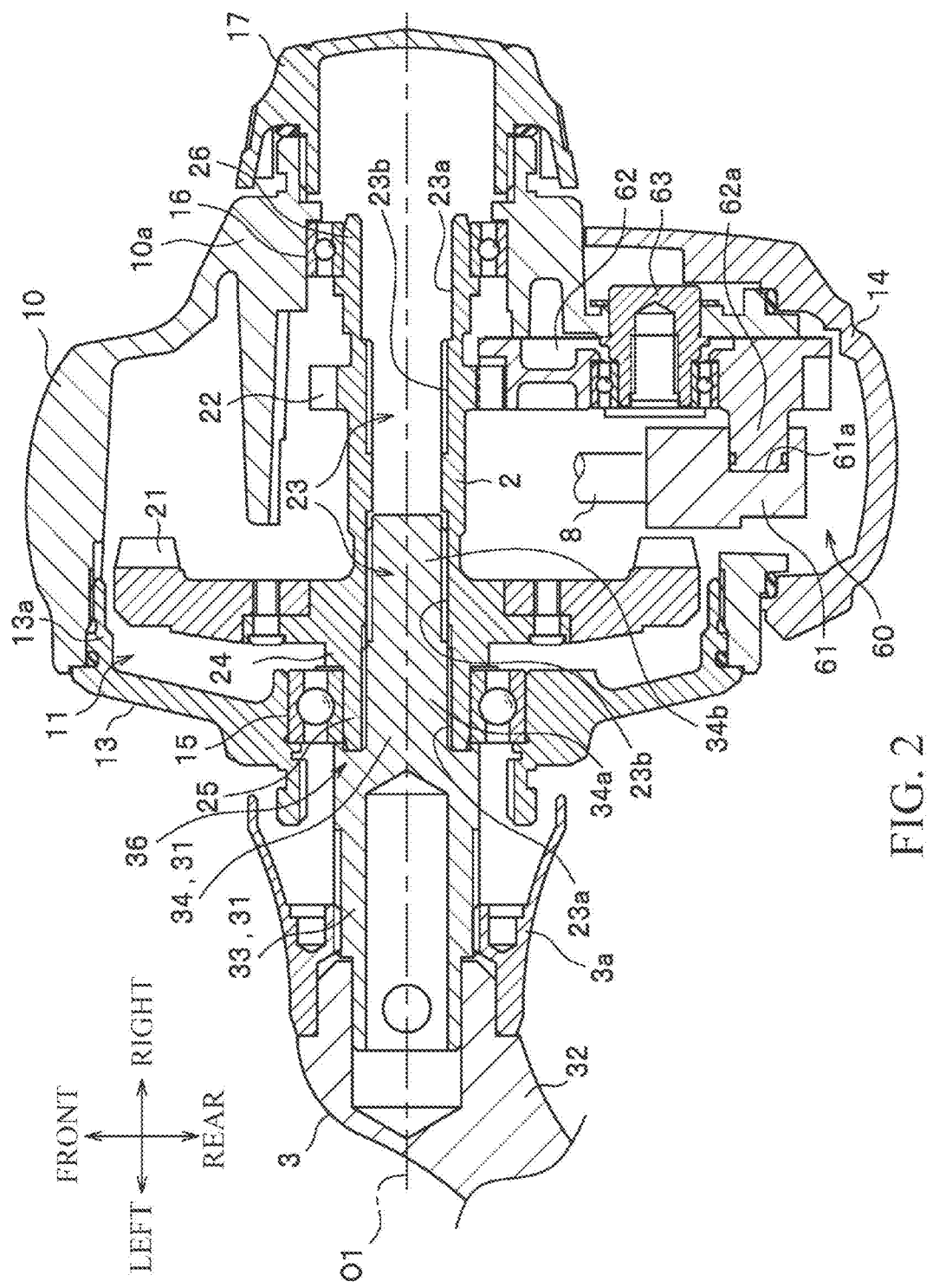
FIG. 2 is an end view of a cross section taken along the line II-II of FIG. 1 as viewed from an arrow direction.

As illustrated in FIG. 2, the lid member 13 comprises a cylindrical insertion portion 13a to be inserted into the side opening 11. A male screw portion is formed on an outer peripheral surface of the insertion portion 13a. The male screw portion is screwed with a female screw portion formed on an inner peripheral surface of the side opening 11. By this screwing, the body 10 and the lid member 13 are integrated.

The body 10 comprises a drive gear shaft 2 extending in a left-right direction and a spool reciprocating device 60 as a configuration for driving the drive shaft cylinder and the spool shaft 8 in conjunction with the operation of the handle 3.

As illustrated in FIG. 2, the drive gear shaft 2 comprises a drive gear 21 and a gear 22. The drive gear shaft 2 is rotatably supported by the lid member 13 and the body 10 via left and right ball bearings 15 and 16. A handle shaft 31 provided in the handle 3 is screwed into the drive gear shaft 2. As a result, the handle 3 and the drive gear shaft 2 rotate integrally. Details of the drive gear shaft 2 and the handle 3 will be described later.

The spool reciprocating device 60 comprises a slider 61 and an interlocking gear 62, and is configured such that the slider 61 moves in the front-rear direction along a guide shaft (not illustrated in the drawings) extending in the front-rear direction of the body 10. The slider 61 is fixed to a rear end of the spool shaft 8 and comprises a guide groove 61a opened to the right side. The interlocking gear 62 is supported by a support member 63 provided on a right side wall 10a of the body 10, and rotates while meshing with the gear 22 of the drive gear shaft 2. The interlocking gear 62 comprises an eccentric protrusion portion 62a that engages with the guide groove 61a of the slider 61.

As described above, when the drive gear shaft 2 and the gear 22 rotate by the winding operation of the handle 3, the interlocking gear 62 rotates, and the rotational motion is converted into a front-rear motion of the slider 61 via the eccentric protrusion portion 62a and the guide groove 61a. As a result, the spool shaft 8 (spool 5) reciprocates in the front-rear direction.

Next, the drive gear shaft 2, the handle 3, and a connection structure thereof will be described in detail.

As illustrated in FIG. 2, the drive gear shaft 2 has a substantially cylindrical shape, and comprises a stepped circular outer peripheral surface along a center axis O1 and screw holes 23 and 23 opened to the left and right. The handle 3 can be attached to the left side by the screw hole 23 of the left side, and the handle 3 can be attached to the right side by the screw hole 23 of the right side (see FIG. 5).

Each of the screw holes 23 has a large-diameter inner peripheral surface 23a formed on the opening side and a small-diameter inner peripheral surface 23b formed on the back side of the large-diameter inner peripheral surface 23a and having a smaller diameter than the large-diameter inner peripheral surface 23a. The female screws for screwing the handle shaft 31 are formed on the left large-diameter inner peripheral surface 23a and the right small-diameter inner peripheral surface 23b, respectively. The female screw of the left large-diameter inner peripheral surface 23a is a reverse screw opposite to a normal screw. On the other hand, the female screw of the right small-diameter inner peripheral surface 23b is a normal screw.

On the outer peripheral surface of the drive gear shaft 2, the drive gear 21 is integrally formed at a position shifted leftward from the center portion in the left-right direction. Further, the gear 22 is integrally formed at a position shifted rightward from the center portion of the drive gear shaft 2 in the left-right direction. The drive gear shaft 2 and the drive gear 21 are formed of an aluminum alloy. Note that, in the fishing spinning reel (hereinafter, referred to as a "high-load fishing spinning reel") 100 corresponding to a high-load winding operation of winding a fishing line under a situation where a high load acts, the drive gear shaft 2 may be formed of, for example, stainless steel or steel instead of the aluminum alloy.

Next, a connection structure on the left side of the drive gear shaft 2 will be described in detail with reference to FIG. 3.

A first outer peripheral portion 24 continuous with the left side of the drive gear 21 and a second outer peripheral portion 25 continuous with the left side of the first outer peripheral portion 24 and having a diameter smaller than that of the first outer peripheral portion 24 are formed on a left outer peripheral surface of the drive gear shaft 2. A ring-shaped stepped surface 25a orthogonal to the center axis O1 (see FIG. 2; the same is applied hereinafter) is formed between the first outer peripheral portion 24 and the second outer peripheral portion 25. An outer peripheral surface of the second outer peripheral portion 25 functions as a seat surface in which the left ball bearing 15 is externally fitted. The stepped surface 25a functions as a positioning surface on which a right side surface of the inner ring 15a of the left ball bearing 15 is positioned via an annular washer 24a.

Note that an outer ring 15b of the left ball bearing 15 is fitted into a circular inner peripheral surface of the lid member 13 centered on the center axis O1.

A left end of the second outer peripheral portion 25 has a size protruding leftward from a left side surface of an inner ring 15a of the left ball bearing 15. A left end outer peripheral surface 25b of the second outer peripheral portion 25 is a tapered inclined surface that is narrowed toward the left end, and is separated from the inner ring 15a of the left ball bearing 15. As a result, an outer diameter of the left end of the drive gear shaft 2 is smaller than an inner diameter of the left ball bearing 15.

Here, the left and right ball bearings 15 and 16 are formed of stainless steel.

Figure 4:
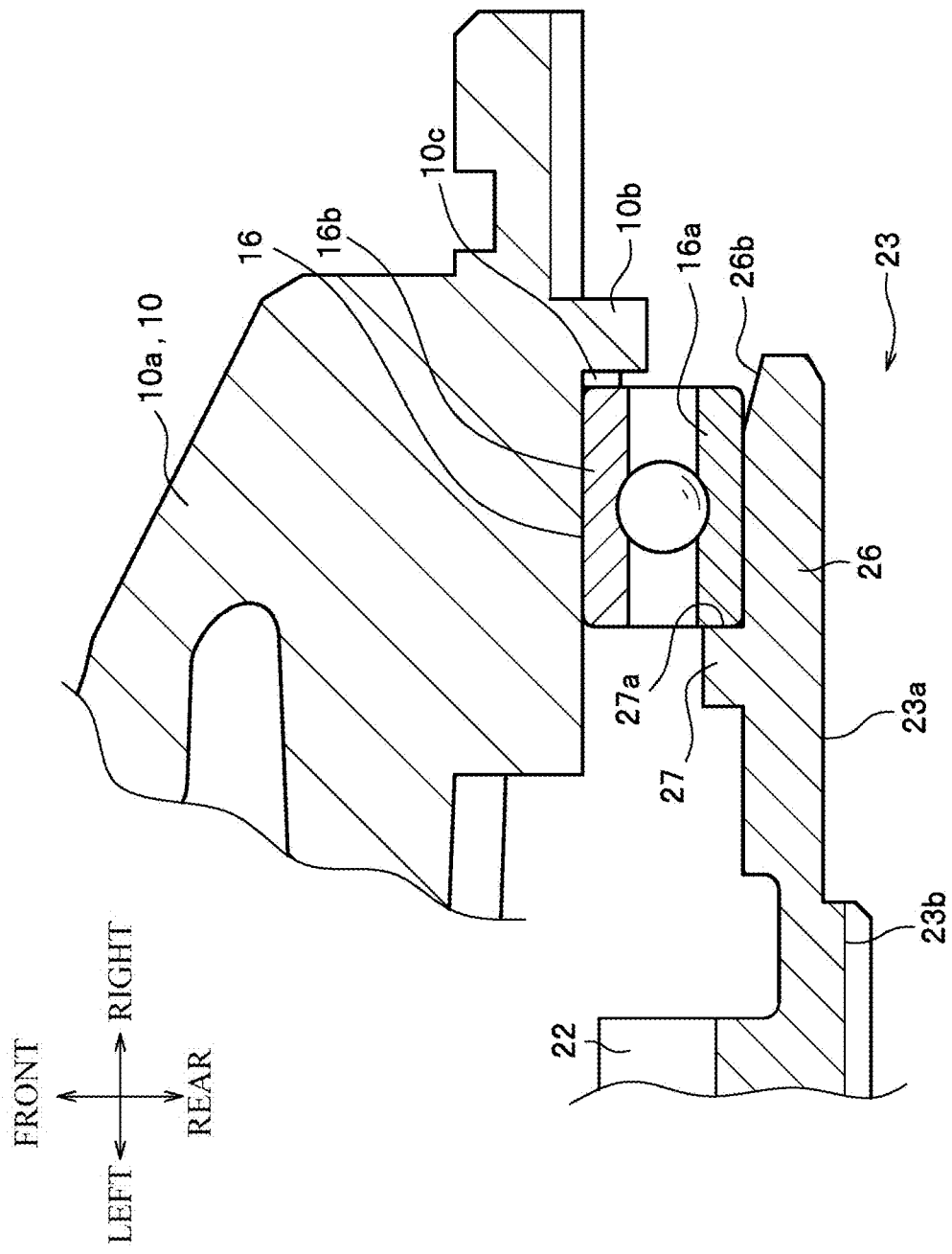
FIG. 4 is a partially enlarged cross-sectional view illustrating a structure of a right side of the drive gear shaft.

Next, a connection structure on the right side of the drive gear shaft 2 will be described in detail with reference to FIG. 4.

A third outer peripheral portion 26 continuous with the right side of the gear 22 is formed on a right outer peripheral surface of the drive gear shaft 2. A positioning projection 27 protruding outward in a radial direction is formed on an outer peripheral surface of the third outer peripheral portion 26. On the right side of the positioning projection 27, the outer peripheral surface of the third outer peripheral portion 26 functions as a seat surface into which the right ball bearing 16 is externally fitted. A right side surface 27a of the positioning projection 27 functions as a positioning surface where the left side surface of the inner ring 16a of the right ball bearing 16 is positioned.

Note that the outer ring 16b of the right ball bearing 16 is fitted into the right side wall 10a of the reel body 1 on the left side of an annular inner peripheral portion 10b centered on the center axis O1 via a washer 10c. The cover member 17 is mounted on the right side wall 10a (see FIG. 2).

A right end of the third outer peripheral portion 26 has a size protruding rightward from the right side surface of the inner ring 16a of the right ball bearing 16. Similarly to the left end outer peripheral surface 25b described above, the right end outer peripheral surface 26b of the third outer peripheral portion 26 is a tapered inclined surface that is narrowed toward the right end, and is separated from the inner ring 16a of the right ball bearing 16. As a result, an outer diameter of the right end of the third outer peripheral portion 26 is smaller than an inner diameter of the right ball bearing 16.

Next, the handle 3 will be described. As illustrated in FIG. 2, the handle 3 comprises an arm portion 32 and a handle shaft 31 connected to the arm portion 32 and having a stepped circular outer peripheral surface along the center axis O1. The cover member 3a is attached to a connection portion of the arm portion 32 and the handle shaft 31.

The handle shaft 31 comprises a large-diameter base portion 33 connected to the arm portion 32, and a small-diameter insertion portion 34 which is formed to be continuous with the base portion 33 and have a diameter smaller than that of the base portion 33 and is inserted into the screw hole 23 of the drive gear shaft 2. The handle shaft 31 is formed of a high-strength material having higher strength than the drive gear shaft 2, for example, stainless steel or steel. Note that the handle shaft 31 may be formed of another high-strength material, for example, a titanium alloy or an aluminum alloy.

Here, a relation between the strengths of the materials of the drive gear shaft 2, the ball bearings 15 and 16, and the handle shaft 31 is handle shaft 31>ball bearings 15 and 16>drive gear shaft 2. Note that, in the high-load fishing spinning reel 100, the relation between these strengths can be set as handle shaft 31 ☐ drive gear shaft 2>ball bearings 15 and 16. As another relation of the strengths, ball bearings 15 and 16>handle shaft 31 ☐ drive gear shaft 2 can be set. As described above, in the setting in which the strengths of the ball bearings 15 and 16 are higher than those of the handle shaft 31 and the drive gear shaft 2, it is possible to suppress the damage of the ball bearings 15 and 16 and to satisfactorily maintain rotation feeling of the handle 3 over a long period. In particular, in the high-load fishing spinning reel 100, since the load acting on the drive gear shaft 2 is high, it is preferable to increase the strengths of the ball bearings 15 and 16.

The base portion 33 has a substantially bottomed cylindrical shape having an opening on the side of the arm portion 32, and has a hollow inside. The insertion portion 34 has a substantially columnar shape, and comprises a first insertion portion 34a continuous with a bottom portion of the base portion 33 and a second insertion portion 34b continuous with the first insertion portion 34a. The first insertion portion 34a comprises an outer peripheral surface having a diameter smaller than that of the base portion 33. An abutting portion 36 is integrally provided at a boundary portion between the base portion 33 and the first insertion portion 34a.

Figure 3:
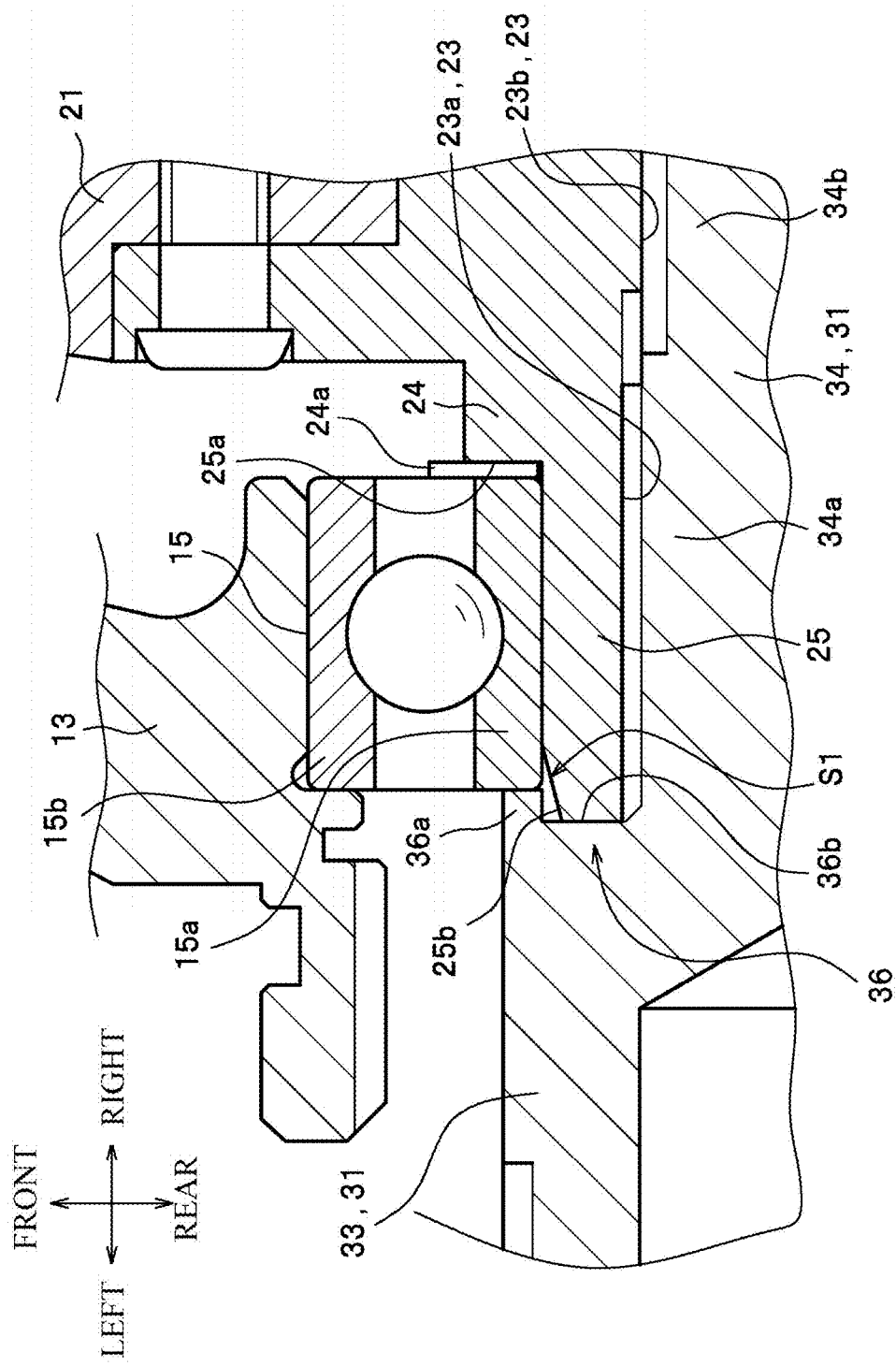
FIG. 3 is a partially enlarged cross-sectional view illustrating a connection structure of a drive gear shaft and a handle shaft at the time of left-hand steering.

As illustrated in FIG. 3, the abutting portion 36 comprises a protrusion portion 36a and an abutting surface 36b. The protrusion portion 36a has a circular annular shape and protrudes rightward from an outer peripheral edge portion of the base portion 33. The protrusion portion 36a has a substantially rectangular cross section. The protrusion portion 36a faces the left side surface of the inner ring 15a of the left ball bearing 15, and is configured to abut on the left side surface of the inner ring 15a in the process of fastening the handle shaft 31 to the drive gear shaft 2.

The abutting surface 36b is a ring-shaped flat surface that is continuous with the radially inner side of the protrusion portion 36a and orthogonal to the center axis O1. The abutting surface 36b faces a left end face of the second outer peripheral portion 25 of the drive gear shaft 2, and is configured to abut on the left end face of the second outer peripheral portion 25 in the process of fastening the handle shaft 31 to the drive gear shaft 2.

In the present embodiment, the abutting surface 36b is set to simultaneously abut on the left end face of the second outer peripheral portion 25 at timing when the protrusion portion 36a abuts on the left side surface of the inner ring 15a.

That is, both the protrusion portion 36a and the abutting surface 36b of the abutting portion 36 are used to abut on the second outer peripheral portion 25 and the inner ring 15a on the side of the drive gear shaft 2.

A gap portion S1 is formed on the radially inner side of the protrusion portion 36a. The gap portion S1 is partitioned by the radially inner peripheral surface of the protrusion portion 36a, the abutting surface 36b, the left end outer peripheral surface 25b of the second outer peripheral portion 25, and the inner ring 15a of the left ball bearing 15, and has a substantially triangular cross section.

In the present embodiment, as described above, the abutting surface 36b is set to simultaneously abut on the left end face of the second outer peripheral portion 25 at the timing when the protrusion portion 36a abuts on the left side surface of the inner ring 15a, but the present disclosure is not limited thereto. For example, when the protrusion portion 36a abuts on the left side surface of the inner ring 15a, a gap may be formed between the left end face of the second outer peripheral portion 25 and the abutting surface 36b. That is, the handle shaft 31 may be fixed to the drive gear shaft 2 by crimping the protrusion portion 36a to the inner ring 15a.

Contrary to the above, in the process of fastening the handle shaft 31 to the drive gear shaft 2, the abutting surface 36b may abut on the left end face of the second outer peripheral portion 25, and then the protrusion portion 36a may abut on the left side surface of the inner ring 15a.

In this case, since the abutting surface 36b abuts on the left end face of the second outer peripheral portion 25 first in the process of fastening, it is possible to crimp the protrusion portion 36a to the left side surface of the inner ring 15a while positively buckling and deforming the left end of the second outer peripheral portion 25 by the abutting of the abutting portion 36 comprising a high-strength material. At this time, the gap portion S1 formed at the left end of the second outer peripheral portion 25 functions as a space for releasing the buckled and deformed portion. That is, the protrusion portion 36a can be crimped to the left side surface of the inner ring 15a while promoting suitable buckling deformation of the left end of the second outer peripheral portion 25.

Figure 5:
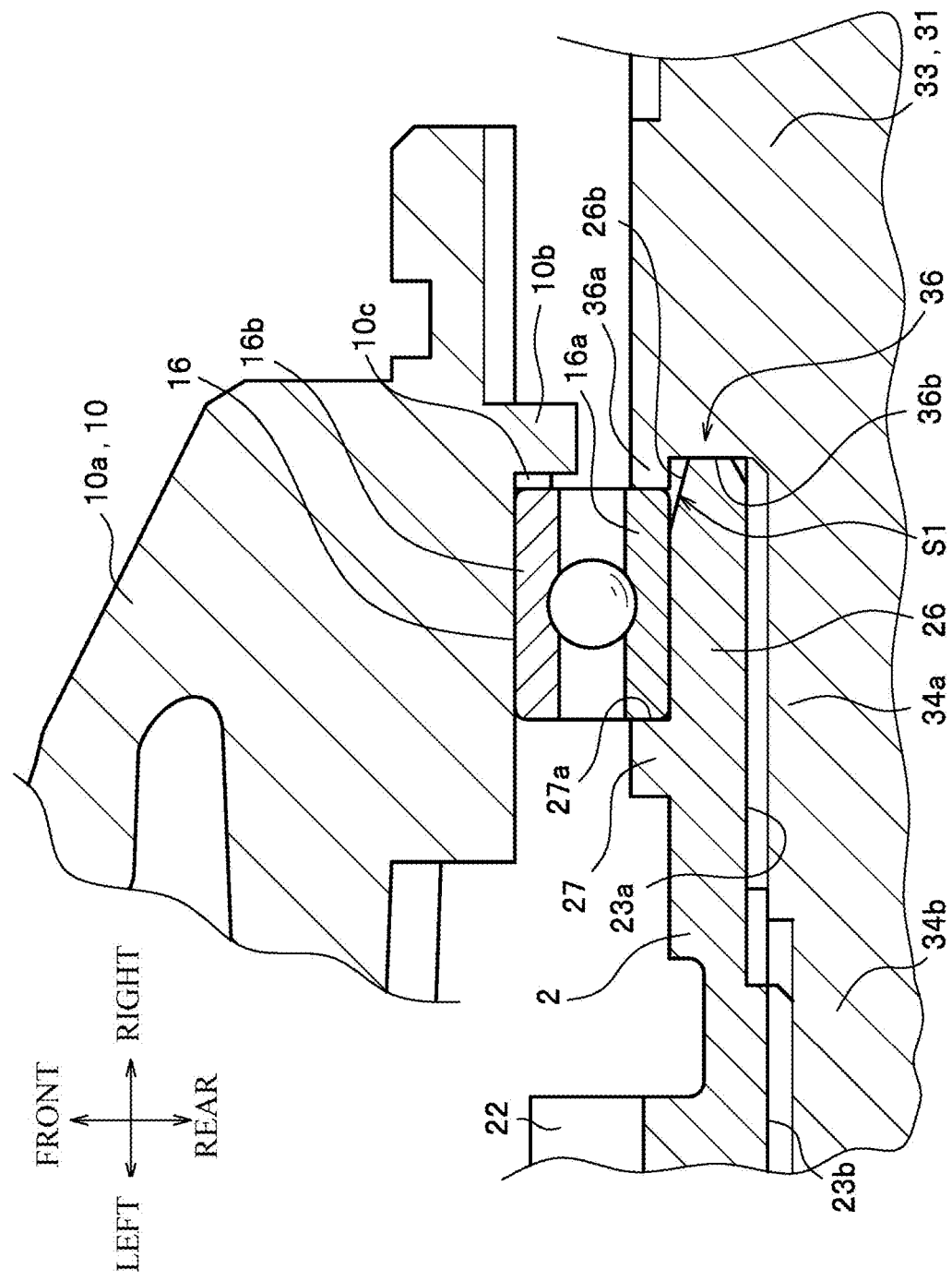
FIG. 5 is an enlarged cross-sectional view illustrating a connection structure of the drive gear shaft and the handle shaft at the time of right-hand steering.

FIG. 5 is an enlarged cross-sectional view illustrating a connection structure of the drive gear shaft 2 and the handle shaft 31 at the time of right-hand steering.

At the time of right-hand steering, the second insertion portion 34b on the side of the distal end of the handle shaft 31 is screwed into the small-diameter inner peripheral surface 23b on the back side of the screw hole 23. The protrusion portion 36a of the abutting portion 36 faces the right side surface of the inner ring 16a of the right ball bearing 16, and abuts on the right side surface of the inner ring 16a in the process of fastening the handle shaft 31 to the drive gear shaft 2.

On the other hand, the abutting surface 36b faces a right end face of the third outer peripheral portion 26 of the drive gear shaft 2, and abuts on the right end face of the third outer peripheral portion 26 in the process of fastening the handle shaft 31 to the drive gear shaft 2. Even in this case, the abutting surface 36b is set to simultaneously abut on the right end face of the third outer peripheral portion 26 at timing when the protrusion portion 36a abuts on the right side surface of the inner ring 16a.

That is, the entire left side surface of the abutting portion 36 is used to abut on the third outer peripheral portion 26 and the inner ring 16a on the side of the drive gear shaft 2.

Even at the time of right-hand steering, the gap portion S1 is formed on the radially inner side of the protrusion portion 36a. The gap portion S1 is partitioned by the radially inner peripheral surface of the protrusion portion 36a, the abutting surface 36b, the right end outer peripheral surface 26b of the third outer peripheral portion 26, and the inner ring 16a of the right ball bearing 16, and has a substantially triangular cross section.

As described above, the abutting surface 36b is set to simultaneously abut on the right end face of the third outer peripheral portion 26 at the timing when the protrusion portion 36a abuts on the right side surface of the inner ring 16a, but the present disclosure is not limited thereto. For example, when the protrusion portion 36a abuts on the right side surface of the inner ring 16a, a gap may be formed between the right end face of the third outer peripheral portion 26 and the abutting surface 36b. That is, the handle shaft 31 may be fixed to the drive gear shaft 2 by mainly crimping the protrusion portion 36a to the right side surface of the inner ring 16a.

Contrary to the above, in the process of fastening the handle shaft 31 to the drive gear shaft 2, the abutting surface 36b may abut on the right end face of the third outer peripheral portion 26 first, and then the protrusion portion 36a may abut on the right side surface of the inner ring 16a.

In this case, since the abutting surface 36b abuts on the right end face of the third outer peripheral portion 26 first in the process of fastening, it is possible to crimp the protrusion portion 36a to the left side surface of the inner ring 16a while positively buckling and deforming the right end of the third outer peripheral portion 26 by the abutting of the abutting portion 36 comprising a high-strength material. At this time, the gap portion S1 formed at the right end of the third outer peripheral portion 26 functions as a space for releasing the buckled and deformed portion. That is, the protrusion portion 36a can be crimped to the right side surface of the inner ring 16a while promoting suitable buckling deformation of the right end of the third outer peripheral portion 26.

According to the present embodiment described above, for example, when the handle shaft 31 is screwed into the drive gear shaft 2 at the time of left-hand steering, the abutting portion 36 (protrusion portion 36a) of the handle shaft 31 approaches and abuts on the inner ring 15a of the left ball bearing 15, and the handle shaft 31 is fixed to the drive gear shaft 2. That is, the handle shaft 31 can be fixed to the drive gear shaft 2 in a state where the crimping force due to the screwing of the handle shaft 31 is suppressed by the stopper of the abutting portion 36 on the inner ring 15a of the left ball bearing 15. As a result, it is possible to prevent the end of the drive gear shaft 2 from being buckled due to the screwing of the handle shaft 31.

In addition, since the abutting portion 36 is provided integrally with the handle shaft 31, it is not necessary to interpose a conventional cylindrical member between the drive gear shaft 2 and the handle shaft 31. Therefore, the connection structure of the drive gear shaft 2 and the handle shaft 31 can be simplified, and the cost can be reduced.

In addition, since the abutting portion 36 is provided integrally with the handle shaft 31, the handle shaft 31 can be manufactured with high dimensional accuracy, and the strength is increased as compared with a case where a conventional cylindrical member is used.

In addition, since the abutting surface 36b simultaneously abuts on the left end face of the second outer peripheral portion 25 at the timing when the protrusion portion 36a abuts on the left side surface of the inner ring 15a, a portion (area) that supports the axial force due to the screwing of the handle shaft 31 can be increased, and the strength can be improved.

In addition, since the handle shaft 31 comprises a high-strength material having higher strength than the left ball bearing 15, the following functions and effects are obtained in a case where a gap is set to be formed between the left end face of the second outer peripheral portion 25 and the abutting surface 36b when the protrusion portion 36a abuts on the left side surface of the inner ring 15a. That is, even if the left ball bearing 15 is deformed by being pushed by the protrusion portion 36a due to excessive tightening of the handle shaft 31, it is sufficient to replace the left ball bearing 15 which is cheaper than the drive gear shaft 2, so that maintenance is easy and repair cost can be reduced.

Conversely, when the abutting surface 36b abuts on the left end face of the second outer peripheral portion 25, and then the protrusion portion 36a abuts on the left side surface of the inner ring 15a, the left end of the second outer peripheral portion 25 is buckled and deformed by the abutting of the abutting portion 36, and then the abutting portion 36 abuts on the inner ring 15a. Therefore, even in this case, since the portion that supports the axial force due to the screwing of the handle shaft 31 can be finally increased, the strength can be improved.

The functions and effects described above can be similarly obtained even when the handle shaft 31 is screwed into the right side of the drive gear shaft 2.

Second Embodiment

Figure 6:
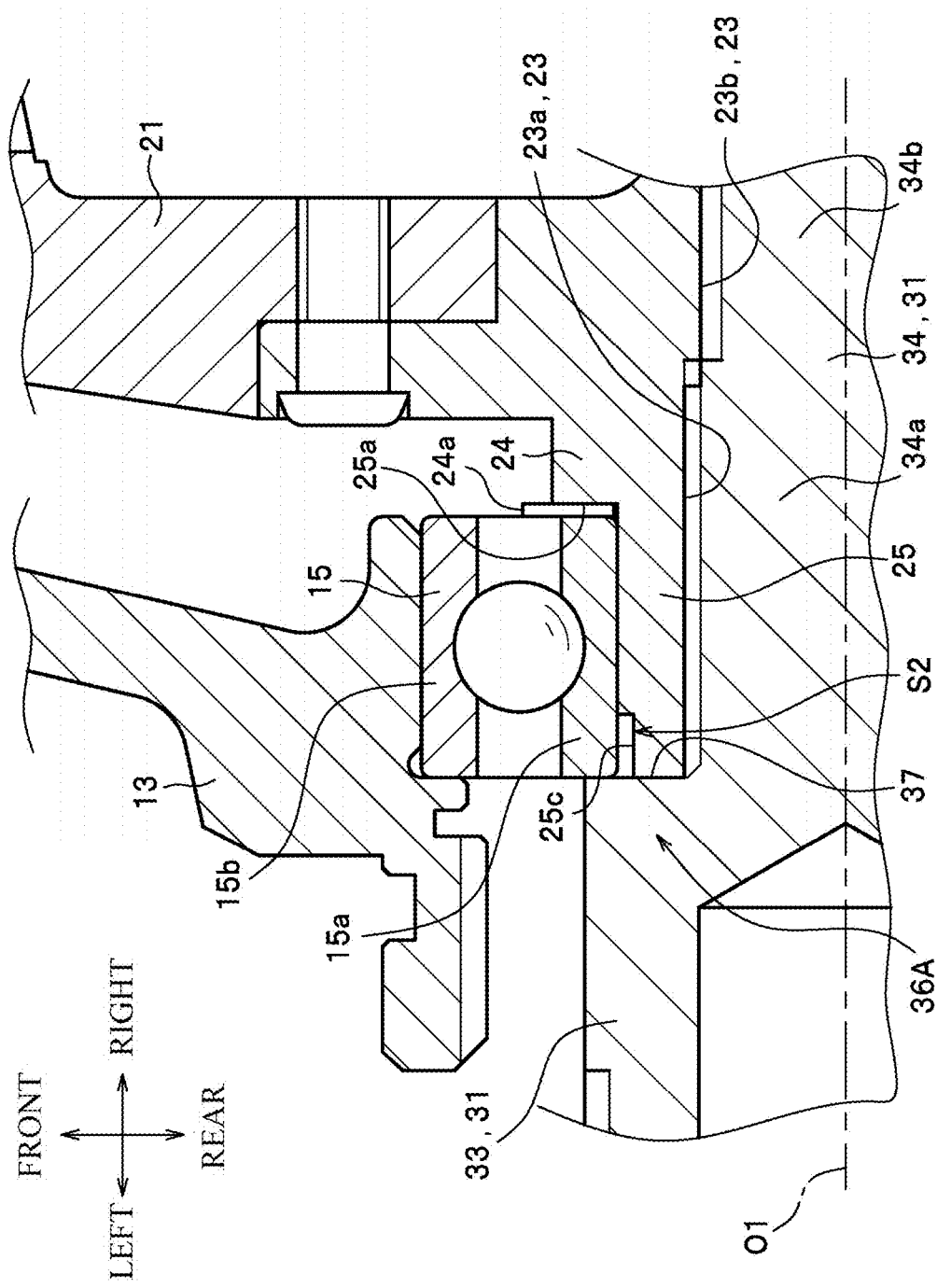
FIG. 6 is a partially enlarged cross-sectional view illustrating a connection structure of a drive gear shaft and a handle shaft at the time of left-hand steering in a fishing spinning reel according to a second embodiment of the present disclosure.

A fishing spinning reel according to a second embodiment of the present disclosure will be described with reference to FIG. 6. The present embodiment is different from the first embodiment in that an abutting portion 36A has a flat surface.

The abutting portion 36A comprises an abutting surface 37 orthogonal to a center axis O1. The abutting surface 37 forms a flat surface over both a portion facing a left side surface of an inner ring 15a and a portion facing a left end face of a second outer peripheral portion 25.

On the other hand, the left side surface of the inner ring 15a and the left end face of the second outer peripheral portion 25 are also flush in a direction orthogonal to the center axis O1, and are set to be flat corresponding to the abutting surface 37 of the abutting portion 36A.

As a result, in the process of fastening a handle shaft 31 to a drive gear shaft 2, the abutting surface 37 of the abutting portion 36A simultaneously abuts on the left side surface of the inner ring 15a and the left end face of the second outer peripheral portion 25. The same is also applied to a connection structure at the time of right-hand steering.

In the present embodiment, a gap portion S2 having a different shape is formed at the left end of the second outer peripheral portion 25 instead of a gap portion S1 described in the first embodiment. In the gap portion S2, a left end outer peripheral surface 25c of the second outer peripheral portion 25 is a stepped surface having a small diameter.

According to the present embodiment described above, since the abutting surface 37 forming a flat surface is provided in addition to the same functions and effects as those described in the first embodiment, workability of the handle shaft 31 is improved. As a result, cost can be reduced.

In the present embodiment, the abutting surface 37 of the abutting portion 36A is set to simultaneously abut on the left side surface of the inner ring 15a and the left end face of the second outer peripheral portion 25, but the present disclosure is not limited thereto. For example, when the abutting surface 37 abuts on the left side surface of the inner ring 15a, a gap may be formed between the left end face of the second outer peripheral portion 25 and the abutting surface 37. That is, the handle shaft 31 may be fixed to the drive gear shaft 2 by crimping the abutting surface 37 to the inner ring 15a. Even in this case, since the abutting surface 37 is a flat surface, the workability of the handle shaft 31 is improved, and the cost can be reduced.

In addition, even if the left ball bearing 15 is deformed by being pushed by the abutting portion 36A due to excessive tightening of the handle shaft 31, it is sufficient to replace the left ball bearing 15 which is cheaper than the drive gear shaft 2, so that maintenance is easy and repair cost can be reduced.

Conversely, the abutting surface 37 may abut on the left end face of the second outer peripheral portion 25, and then the abutting surface 37 may abut on the left side surface of the inner ring 15a. Even in this case, since the abutting surface 37 is a flat surface, the workability of the handle shaft 31 is improved, and the cost can be reduced.

In this case, the left end of the second outer peripheral portion 25 is buckled and deformed by the abutting of the abutting surface 37 and then the abutting surface 37 abuts on the inner ring 15a, and a portion that supports the axial force due to the screwing of the handle shaft 31 can be finally increased, so that the strength can be improved.

The functions and effects described above can be similarly obtained even when the handle shaft 31 is screwed into the right side of the drive gear shaft 2.

Although the embodiments have been described above, the present disclosure is not limited to the examples described in the embodiments.

For example, in the above embodiments, the abutting portions 36 and 36A are configured using the stepped structure formed at the boundary portion between the base portion 33 and the insertion portion 34 of the handle shaft 31. However, the present disclosure is not limited thereto, and a flange-shaped peripheral wall or the like protruding outward in the circumferential direction may be partially formed on the outer peripheral portion of the handle shaft 31, and the abutting portions may be configured to abut on the inner rings 15a and 16a using side surfaces thereof. Even in this case, the same functions and effects as the functions and effects described in the above embodiments can be obtained.

In the above embodiments, the gap portions S1 and S2 are formed in the drive gear shaft 2. However, the present disclosure is not limited thereto, and the gap portions S1 and S2 may not be necessarily provided as long as buckling deformation does not occur. Further, the shape of the left end of the second outer peripheral portion 25 and the shape of the right end of the third outer peripheral portion 26 for forming the gap portions S1 and S2 can adopt various shapes.

In the above embodiments, the handle shaft 31 is connected to the arm portion 32. However, the present disclosure is not limited thereto, and the handle shaft 31 may be provided integrally with the arm portion 32.

In the above embodiments, the fishing spinning reel 100 in which the lid member 13 is screwed into the side opening 11 has been described. However, the present disclosure is not limited thereto, and the present disclosure can also be suitably applied to a fishing spinning reel in which the lid member is fixed to the reel body using a screw or other fixing mechanism.

REFERENCE SIGNS LIST 1 reel body
2 drive gear shaft
3 handle
15 left ball bearing (ball bearing)
15a inner ring
16 right ball bearing (ball bearing)
16a inner ring
31 handle shaft
33 base portion
34 insertion portion
36, 36A abutting portion
100 fishing spinning reel

What is claimed is:

1. A fishing spinning reel in which a handle is attachable to and detachable from a reel body, the fishing spinning reel comprising:
   a drive gear shaft that is provided in the reel body;
   a ball bearing that is externally fitted into the drive gear shaft and rotatably supports the drive gear shaft; and
   a handle shaft that is provided in the handle and is screwed into the drive gear shaft, wherein
   the handle shaft is integrally provided with an abutting portion that is configured to abut on an inner ring of the ball bearing by the screwing into the drive gear shaft, the abutting portion is configured to (i) abut the end face of the drive gear shaft with a gap between the abutting portion and the inner ring of the ball bearing and (ii) abut on the inner ring of the ball bearing after abutting on the end face of the drive gear shaft when the handle shaft is screwed into the drive gear shaft.

2. The fishing spinning reel according to claim 1, wherein the handle shaft comprises a base portion that has a large diameter and an insertion portion that is formed to have a diameter smaller than the diameter of the base portion and is inserted into the drive gear shaft, and
the abutting portion is provided at a boundary portion between the base portion and the insertion portion.

3. The fishing spinning reel according to claim 1, wherein the handle shaft comprises a high-strength material having higher strength than the ball bearing.

4. The fishing spinning reel according to claim 1, wherein an outer diameter of an end of the drive gear shaft is smaller than an inner diameter of the ball bearing.

5. The fishing spinning reel according to claim 1, wherein the abutting portion comprises a portion facing the ball bearing and a portion facing the end of the drive gear shaft, and forms a flat surface over both the portions.

6. The fishing spinning reel according to claim 1, wherein the abutting portion has a protrusion portion, and
on a radially inner side of the protrusion portion, a gap portion is formed by a radially inner peripheral surface of the protrusion portion, an abutting surface of the abutting portion, an end outer peripheral surface of an outer peripheral portion of the drive gear shaft, and the inner ring of the ball bearing.

* * * * *